United States Patent

Yoshida et al.

[11] Patent Number: 4,924,958
[45] Date of Patent: May 15, 1990

[54] FINGER SKIRT FOR AN AIR CUSHION VEHICLE

[75] Inventors: Ryuichi Yoshida, Takarazuka; Tokio Ohnishi, Ushiku; Tetsushi Yamamura, Takasago; Kanta Nihei, Nishi; Shingo Takaeda, Funabashi, all of Japan

[73] Assignee: Kawasaki Jukogyo Kabushiki Kaisha, Kobe, Japan

[21] Appl. No.: 219,657

[22] Filed: Jul. 15, 1988

[30] Foreign Application Priority Data

Jul. 17, 1987 [JP] Japan ................. 62-109019

[51] Int. Cl.$^5$ ................................ B60V 1/16
[52] U.S. Cl. ...................... 180/128; 114/67 A
[58] Field of Search ............... 180/127, 128, 129, 123; 114/67 A

[56] References Cited

U.S. PATENT DOCUMENTS 4,488,614 12/1984 Lafont et al. ............... 180/127
4,494,473 1/1985 Simpson ..................... 180/127

Primary Examiner—Charles A. Marmor
Assistant Examiner—Richard Camby
Attorney, Agent, or Firm—Marshall, O'Toole, Gerstein, Murray & Bicknell

[57] ABSTRACT

A finger skirt for an air-cushion vehicle wherein the bottom edge of each finger skirt, when it is in the state of inflation by the pressurized air for the levitation of the hull, is shaped so that it extends horizontally at the location where it comes in contact with the pressure-receiving surface, the bottom edge being formed so that its cross section is a circular arc.

6 Claims, 2 Drawing Sheets

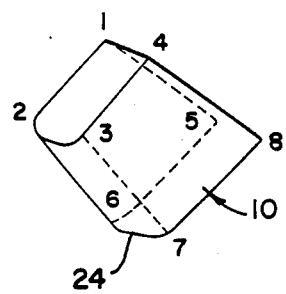
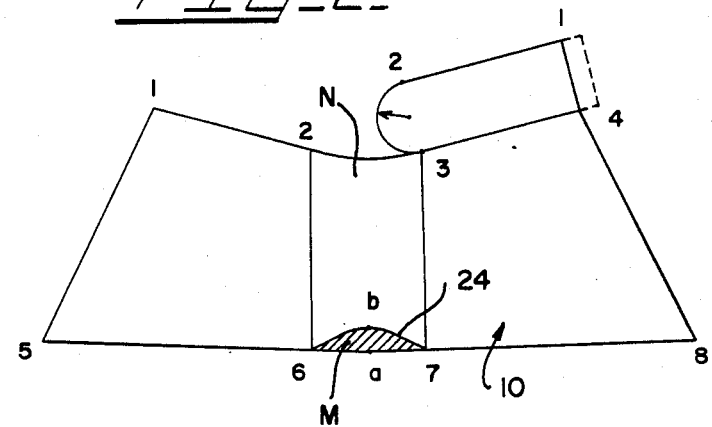
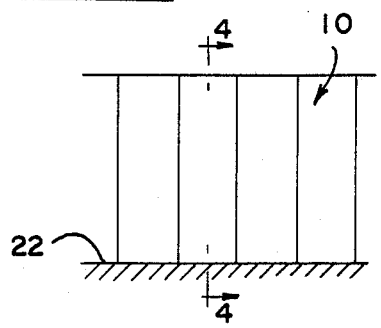
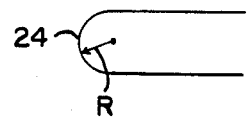
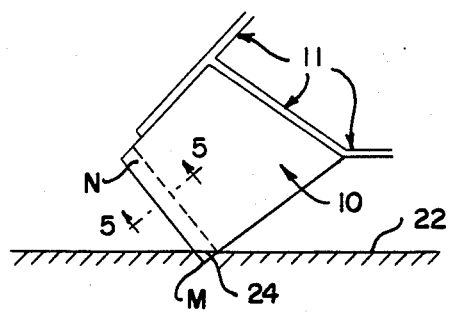

FIG-6- PRIOR ART
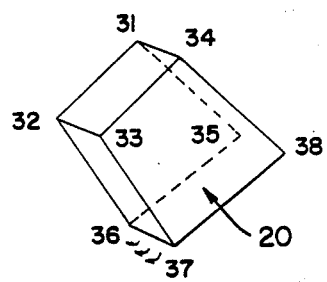
FIG-7- PRIOR ART
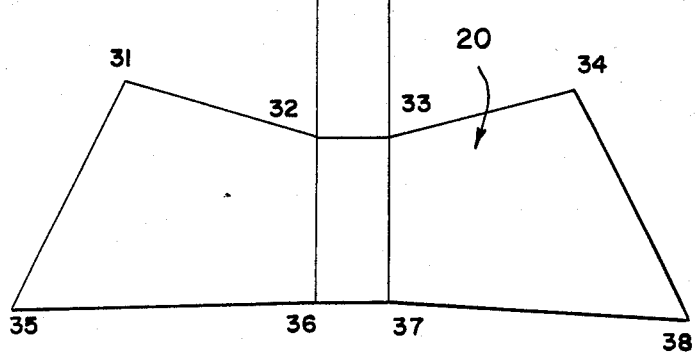
FIG-8- PRIOR ART
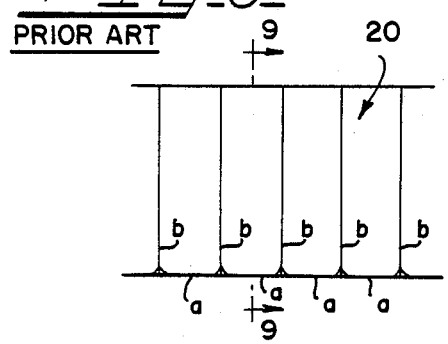
FIG-10- PRIOR ART
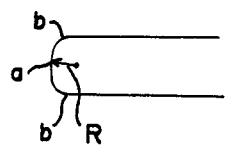
FIG-9- PRIOR ART
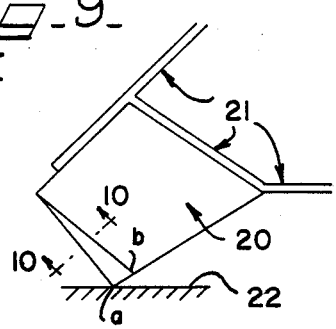

4,924,958

FINGER SKIRT FOR AN AIR CUSHION VEHICLE

FIELD AND BACKGROUND OF THE INVENTION

This invention relates to an air-cushion vehicle in which pressurized air is blown from an engine-driven propeller mounted in the hull against a pressure-receiving surface formed by a ground surface, ice surface, snow surface, or water surface, for example, (hereafter referred to pressure-receiving surface) in order for the vehicle to be levitated and ride on a cushion of air across land, water, ice, snow, marshlands, etc.

Air cushion vehicles, or hovercrafts, are known in the art, and include a hull which supports an engine-driven fan. A skirt extends downwardly from the bottom side of the hull to the surface and encloses a cushion of air. The skirt is formed by a series of finger skirts located around the periphery of the hull. The air from the fan flows into the enclosure and the finger skirts and thus forms the air cushion.

FIGS. 6 through 10 show the construction of a finger skirt in accordance with the prior art. Each finger skirt is an independent collapsible bag which is mounted so that the bottom of the skirt is slanted toward the hull. In FIG. 6, the pressurized air for the levitation of the hull flows into a finger skirt 20 through the two open sides (formed between the points 34, 31, 35, 36, 37 and 38) which face the hull in order to inflate the finger skirt, and then the air flows out through a gap between the pressure-receiving surface 22 beneath the hull 21 and an edge of the skirt which is formed between the points 36 and 37.

Finger skirts are usually fabricated of a flexible material, and, when they are inflated by the pressurized air, they have a tendency to change to an overall rounded shape; however, because the side faces are restricted by the adjacent finger skirts, only the outward face formed by points 32, 33, 37, and 36 changes to a semicylindrical shape as shown in FIG. 10.

Because the attachment of the skirts to the hull is done in such a manner that the bottom of each skirt is slanted toward the hull, the bottom of each inflated skirt is such that point a (shown in FIGS. 8 to 10) is in contact with the pressure-receiving surface 22, and point b, which is the bottom end of the vertical boundary surface with an adjacent skirt, is positioned higher than point a. This is true because the line between the points 36 and 37 becomes arcuate or rounded due to the air pressure, as shown in FIG. 10, and only a short portion (point a) at the center of the line between points 36 and 37 is adjacent the surface 22.

Thus, when the hull is riding on the cushion of air, the pressurized air for the levitation of the hull leaks out through the triangular shaped gaps between the centers of two adjacent finger skirts, of which point b is the vertex. This leakage results in an increase in the amount of force required for levitation, and consequently also in accompanying increases in the sizes of the engine-driven propeller and various ducts, and in the size and weight of the hull itself. Although one method used to counteract this drawback is to reduce the width of the finger skirts in order to reduce the size of the triangular gaps, this results in an increase in the number of skirts, which presents an economic problem economically.

SUMMARY OF THE INVENTION

In accordance with this invention, the foregoing problem is avoided by providing a finger skirt for an air-cushion vehicle wherein the bottom edge of each finger skirt, when it is in the state of inflation by the pressurized air for the levitation of the hull, is shaped so that it extends horizontally at the location where it comes in contact with the pressure-receiving surface, the bottom edge being formed so that its cross section is a circular arc.

BRIEF DESCRIPTION OF THE DRAWINGS

The invention will be better understood from the following detailed description taken in conjunction with the accompanying figures of the drawings, wherein:

FIG. 1 is a perspective view of a finger skirt constructed in accordance with this invention;

FIG. 2 shows an expanded view of the skirt of FIG. 1;

FIG. 3 is a frontal view of a series of finger skirts in the inflated state;

FIG. 4 is a cross-sectional view taken along the line 4—4 of FIG. 3;

FIG. 5 is a cross-sectional view along line 5—5 of FIG. 4; and

FIGS. 6 to 10 are views similar to FIGS. 1 to 5 respectively but show a prior art construction.

DETAILED DESCRIPTION OF THE DRAWINGS

With reference to FIGS. 1 to 5, a conventional engine-driven propeller (not shown) mounted on the hull 11 of an air-cushion vehicle delivers pressurized air which acts to levitate the hull. The air flows into the space formed between the surface 22, the underside of the hull and a plurality of finger skirts 10 provided around the periphery of the hull. From this space, the air flows into the interior of each of the finger skirts 10.

The finger skirts 10 are fabricated of a flexible material, and, as shown in FIG. 1, each one is an independent bag. As shown in FIG. 3, these skirts are arranged in series so as to surround the periphery of the hull. The face or wall of each finger skirt outermost from the hull 11, i.e. the face N formed by points 2, 3, 7, b, 6 and 2 in FIG. 2, is formed in advance into a semicylindrical shape having a radius R of $1/\pi$ of the length of the circular arc which connects points 2 and 3 in FIG. 2.

In addition, as shown in FIG. 4, each finger skirt is mounted to the hull 11 so that its bottom slants upwardly toward the hull. The bottommost edge 24 of the finger skirt is shaped such that the shaded part indicated by area M (FIGS. 2 and 4) formed by points 6, b, 7, a, 6 in FIG. 2 is removed. Consequently, as shown in FIGS. 2 through 4, when the finger skirt is in the inflated state, the bottom edge 24 of each finger skirt and the pressure-receiving surface 22 are substantially in contact along a straight horizontal line.

Thus, after the pressurized air for the levitation of the hull, which air flows beneath the hull, inflates each of the finger skirts 10 to a fixed shape which is always uniform regardless of any changes in the pressure of the pressurized air, the pressurized air flows out through the gap between the bottom edge 24 of each finger skirt and the pressure-receiving surface 22, and it is possible to obtain uniformity of the flow volume and flow speed of the pressurized air which flows out at each point along the periphery of the underside of the hull. The amount of pressurized air which flows out through the gap between the bottom of each finger skirt and the pressure-receiving surface is uniform at all points along the periphery of the underside of the hull.

Furthermore, because the face of each finger skirt positioned outermost from the hull is formed so that the cross section perpendicular to that face is a circular arc, the increase in the pressure of the air which flows into the finger skirt causes the cross section perpendicular to the face of the finger skirt mentioned above to change from a square shape to a semicylindrical shape, which is accompanied by a change in the shape of the pressurized air outlet formed between the bottom of the finger skirt and the pressure-receiving surface, and this prevents any increase in the amount of leakage air not acting to levitate the hull.

Thus, with this invention, for an air-cushion vehicle which rides on a cushion of pressurized air produced by an engine-driven propeller mounted on the hull, against a pressure-receiving surface defined by the underside of the hull and by finger skirts provided around the periphery of the hull, while the hull is riding on the cushion of air, it is possible to prevent the pressurized air needed for the levitation of the hull, which flows out through the gaps between the bottoms of the finger skirts which are inflated by the pressurized air and the pressure-receiving surface, from leaking out through triangular air gaps formed between the inflated, slanted finger skirts and the pressure-receiving surface, as is the case with the prior art.

As a result, through the highly efficient use of the air required for the levitation of the hull, it is possible to reduce the amount of force required, and furthermore, it is also possible, through a reduction in the size of the propeller, ducts, etc., and the accompanying reductions in the size and weight of the hull, to achieve a reduction in production costs.

In addition, there is also the advantage that wear at the edges where the finger skirts contact the ground surface is greatly reduced in comparison to the prior art.

Aside from the construction of the finger skirts, the other parts of the air cushion vehicle may all have conventional constructions.

What is claimed is:

1. An air-cushion vehicle comprising a hull which is levitated above a pressure-receiving surface during operation by a cushion of pressurized air from an engine-driven propeller of the vehicle, said hull comprising a bottom hull wall and peripheral side hull walls extending around and connected to said bottom hull wall, said bottom hull and peripheral side hull walls forming an angle therebetween with said peripheral side hull walls being outermost and extending downwardly, a plurality of finger skirts attached to and extending around the periphery of the hull, each of said finger skirts comprising a plurality of connected walls forming a bag-like configuration, said finger skirt walls including an outermost finger skirt wall, two opposing side finger skirt walls and a top finger skirt wall, said outermost, side and top finger skirt walls closing the outermost, top and sides of each finger skirt and the bottom and innermost sides of each finger skirt being open, said outermost finger skirt wall having a bottom edge, said finger skirt when it is in a state of inflation by said pressurized air having said bottom edge open and shaped to extend substantially horizontally where said bottom edge is engageable with said pressure-receiving surface, and said top and innermost finger skirt walls extending closely adjacent said bottom hull and peripheral side hull walls of said hull.

2. Apparatus as set forth in claim 1, said outermost finger skirt wall which is positioned outermost from the hull is formed so that the cross section perpendicular to said outermost finger skirt wall is a circular arc.

3. Apparatus as set forth in claim 1, wherein said outermost finger skirt wall includes an upper edge and a bottom edge, both of said edges being arcuate.

4. In an air-cushion vehicle comprising a hull which is levitated above a pressure-receiving surface during operation by a cushion of pressurized air from an engine-driven propeller of the vehicle, said hull comprising a bottom hull wall and peripheral side hull walls extending around and connected to said bottom hull wall, said bottom hull and peripheral side hull walls forming an angle therebetween with said peripheral side hull walls being outermost and extending downwardly, the improvement comprising a plurality of finger skirts attached to and extending around the periphery of the hull, each of said finger skirts comprising a plurality of connected walls forming a bag-like configuration, said finger skirt walls including an outermost finger skirt wall, two opposing side finger skirt walls and a top finger skirt wall, said outermost, side and top finger skirt walls closing the outermost, top and sided of each finger skirt and the bottom and innermost sides of each finger skirt being open, said outermost finger skirt wall having a bottom edge, said finger skirt when it is in a state of inflation by said pressurized air having said bottom edge open and shaped to extend substantially horizontally where said bottom edge is engageable with said pressure-receiving surface, and said top and innermost finger skirt walls extending closely adjacent said bottom hull and peripheral side hull walls of said hull.

5. Apparatus as set forth in claim 4, wherein said outermost finger skirt wall which is positioned outermost from the hull is formed so that the cross section perpendicular to said outermost finger skirt wall is a circular arc.

6. Apparatus as set forth in claim 4, wherein said outermost finger skirt wall includes an upper edge and a bottom edge, both of said edges being arcuate.

* * * * *